United States Patent
Su et al.

(10) Patent No.: US 11,968,140 B2
(45) Date of Patent: Apr. 23, 2024

(54) TRANSMISSION METHOD AND APPARATUS

(71) Applicant: DATANG MOBILE COMMUNICATIONS EQUIPMENT CO., LTD., Beijing (CN)

(72) Inventors: Xin Su, Beijing (CN); Qiubin Gao, Beijing (CN); Runhua Chen, Beijing (CN); Deshan Miao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 563 days.

(21) Appl. No.: 17/269,538

(22) PCT Filed: Jun. 12, 2019

(86) PCT No.: PCT/CN2019/090969
§ 371 (c)(1),
(2) Date: Feb. 19, 2021

(87) PCT Pub. No.: WO2020/038081
PCT Pub. Date: Feb. 27, 2020

(65) Prior Publication Data
US 2021/0320767 A1 Oct. 14, 2021

(30) Foreign Application Priority Data
Aug. 20, 2018 (CN) .......................... 201810950594.0

(51) Int. Cl.
*H04L 5/00* (2006.01)
*H04B 7/0413* (2017.01)

(52) U.S. Cl.
CPC ......... *H04L 5/0048* (2013.01); *H04B 7/0413* (2013.01); *H04L 5/0053* (2013.01)

(58) Field of Classification Search
None
See application file for complete search history.

(56) References Cited

U.S. PATENT DOCUMENTS

2014/0293801 A1* 10/2014 Dimou .................... H04W 4/70
370/252
2016/0157139 A1* 6/2016 Kizhakkemadam .........................
H04B 17/309
370/332

FOREIGN PATENT DOCUMENTS

CN 102833053 A 12/2012
CN 105790814 A 7/2016
(Continued)

OTHER PUBLICATIONS

Huawei et al., "Remaining details of codeword mapping in NR", 3GPP TSG RAN WG1 AH NR#3, Nagoya, Japan, Sep. 18-21, 2017, total 4 pages, R1-1715459.
(Continued)

*Primary Examiner* — Hong S Cho
(74) *Attorney, Agent, or Firm* — Kilpatrick Townsend & Stockton LLP

(57) ABSTRACT

The present application relates to the field of communications, and provides a transmission method and apparatus. The method includes a network side device determines a number of Demodulation Reference Signal (DMRS) port groups N occupied by downlink transmission data sent to a terminal, N being greater than or equal to 1; the network side device determines, according to the number of the DMRS port groups occupied by the downlink transmission data, a code word transmission mode corresponding to the downlink transmission data; and the network side device performs data processing on the downlink transmission data according to the code word transmission mode, and transmits the processed downlink transmission data by means of transmission points corresponding to the N DMRS port groups.

19 Claims, 11 Drawing Sheets

(56) References Cited

FOREIGN PATENT DOCUMENTS

| | | |
|---|---|---|
| CN | 106470495 A | 3/2017 |
| CN | 107342852 A | 11/2017 |
| CN | 107733559 A | 2/2018 |
| CN | 108123778 A | 6/2018 |
| CN | 108288985 A | 7/2018 |
| CN | 108289008 A | 7/2018 |
| WO | 2015115804 A1 | 8/2015 |
| WO | 2017076102 A1 | 5/2017 |

OTHER PUBLICATIONS

LG Electronics, "Discussion on codeword mapping", 3GPP TSG RAN WG1 Meeting NR#3, Nagoya, Japan, Sep. 18-21, 2017, total 3 pages, R1-1715850.

\* cited by examiner

TRANSMISSION METHOD AND APPARATUS

CROSS REFERENCE TO RELATED APPLICATIONS

This application is a US National Stage of International Application No. PCT/CN2019/090969, filed on Jun. 12, 2019, which claims the priority of Chinese Patent Application No. 201810950594.0, entitled "Transmission Method and Apparatus", filed with the Chinese Patent Office on Aug. 20, 2018, which is hereby incorporated by reference in its entirety.

FIELD

The present application relates to the field of communications, in particular to a transmission method and apparatus.

BACKGROUND

Mobile and broadband have become the development direction of modern communication technology. 5th-Generation (5G) is the fifth generation of mobile phone communication standards, also known as the fifth-generation mobile communication technology, is also an extension from 4G. As the main direction of the development of the new generation of information and communication, 5G will penetrate into all fields of the future society, to build a comprehensive information ecosystem with users as the center.

Multiple Input Multiple Output (MIMO) technology can increase the peak rate (or peak spectral efficiency) through parallel transmission of data in the spatial domain. Theoretically, a corresponding Modulation and Coding Scheme (MCS) may be selected for each equivalent data transmission channel in a MIMO link according to the channel quality of the data transmission channel to achieve optimization of the throughput. Similar to a Long Term Evolution (LTE) system, in the design of a New Radio (NR) MIMO system, one of the problems faced first is to choose the number of code words. This problem influences, to a large extent, the design of many physical layers, such as CSI feedback, control signaling, and control channels.

Two code word transmission modes are used in the prior art. One is a single code word transmission mode, and the other is a multiple code word transmission mode. Existing specifications stipulate that single code word transmission is used when the number of layers is in the range of 1-4, and double code word transmission is used in transmission with the number of layers in the range of 5-8.

However, in the prior art, during multi-transmission point/multi-transmission plane transmission, in the case of rank 2-4, layers of a code word may be scattered to more than one panel or TRP (Transmission/Reception Point). In this scenario, due to differences in the channel quality of the coordinated TRPs or panels, it is difficult for a unified MCS to match channels of two sets of data layers from different TRPs/panels at the same time, so there may be some performance loss in single code word transmission.

In summary, the prior art cannot provide a method for flexibly determining a code word transmission mode.

SUMMARY

The present application provides a transmission method and apparatus, to solve the problem that the prior art cannot provide a method for flexibly determining a code word transmission mode.

An embodiment of the present application provides a transmission method, including: determining, by a network side device, the number N of DMRS port groups occupied by downlink transmission data sent to a terminal, N being greater than or equal to 1;
  determining, by the network side device, according to the number of the DMRS port groups occupied by the downlink transmission data, a code word transmission mode corresponding to the downlink transmission data; and
  performing, by the network side device, data processing on the downlink transmission data according to the code word transmission mode, and transmitting the processed downlink transmission data via transmission points corresponding to the N DMRS port groups.

In the embodiment of the present application, the network side device determines, according to the number of the DMRS port groups occupied by the downlink transmission data, the code word transmission mode. By determining, via the number of DMRS port groups actually occupied by a data channel, whether to use single code word transmission or double code word transmission, a more flexible method for determining a code word transmission mode is implemented as compared with a method for determining a code word transmission mode by using a specification in the prior art.

In one embodiment, the determining, by the network side device, the number of the DMRS port groups occupied by the downlink transmission data sent to the terminal includes:
  determining, by the network side device, the number of the DMRS port groups occupied by the downlink transmission data according to at least one piece of the following information:
  the number of DMRS port groups recommended by the terminal, a code word transmission mode recommended by the terminal, or the number of transmission layers supported by each transmission point.

In the embodiment of the present application, the network side device may determine the number of the DMRS port groups occupied by the downlink transmission data according to various information, which may be obtained by the network side itself or may also be reported by the terminal.

In one embodiment, before the determining, by the network side device, the number of the DMRS port groups occupied by the downlink transmission data sent to the terminal, the method further includes:
  receiving, by the network side device, an uplink signal sent by the terminal to at least one transmission point; and
  measuring, by the network side device, the uplink signal and determining, by the network side device, the number of transmission layers supported by each transmission point.

In the embodiment of the present application, if the number of transmission layers supported by each transmission point is determined by the network side device, the network side device first needs to receive an uplink signal sent by the terminal, to determine the number of transmission layers supported by each transmission point according to the uplink signal.

In one embodiment, before determining, by the network side device, the number of the DMRS port groups occupied by the downlink transmission data sent to the terminal, the method further includes:
  receiving, by the network side device, CSI reported by the terminal, where the CSI includes the number of transmission layers supported by each transmission point, and the number of transmission layers supported by each transmission point is obtained by the terminal through measuring a downlink signal sent by the network side device to at least one transmission point.

In the embodiment of the present application, if the number of transmission layers supported by each transmission point is determined by the terminal, the network side device first needs to receive CSI sent by the terminal, and determine the number of the DMRS port groups occupied by the downlink transmission data sent to the terminal according to the number of transmission layers supported by each transmission point carried in the CSI.

In one embodiment, before determining, by the network side device, the number of the DMRS port groups occupied by the downlink transmission data sent to the terminal, the method further includes:

receiving, by the network side device, a recommendation message reported by the terminal, where the recommendation message includes the recommended number of DMRS port groups, and/or a recommended code word transmission mode, where the recommended number of DMRS port groups and/or the recommended code word transmission mode is determined by the terminal through measuring a downlink signal sent by the network side device via at least one transmission point.

In the embodiment of the present application, the network side device may also determine the number of the DMRS port groups occupied by the downlink transmission data according to the recommended number of the DMRS port groups and/or the recommended code word transmission mode in the recommendation message reported by the terminal.

In one embodiment, the determining, by the network side device, the number of the DMRS port groups occupied by the downlink transmission data sent to the terminal includes:

determining, by the network side device, the number of the DMRS port groups occupied by the downlink transmission data is 2 if the number of transmission layers supported by each transmission point is greater than or equal to 1; and determining, by the network side device, the number of the DMRS port groups occupied by the downlink transmission data is 1 if the number of transmission layers supported by only one transmission point is greater than or equal to 1.

In the embodiment of the present application, the network side device determines the number of the DMRS port groups occupied by the downlink transmission data according to the number of layers supported by each transmission point; that is, the network side device can flexibly configure the code word transmission mode according to the transmission quality of each transmission point.

In one embodiment, the determining, by the network side device, according to the number of the DMRS port groups occupied by the downlink transmission data, the code word transmission mode corresponding to the downlink transmission data includes:

determining, by the network side device, the code word transmission mode corresponding to the downlink transmission data is double code word transmission if the number of the DMRS port groups occupied by the downlink transmission data is determined to be greater than or equal to 2.

In the embodiment of the present application, the network side device determines to use double code word transmission if the number of the DMRS port groups occupied by the downlink transmission data is greater than or equal to 2, which means that the transmission quality of the downlink data channel permits simultaneous transmission of data of two DMRS port groups.

In one embodiment, the determining, by the network side device, according to the number of the DMRS port groups occupied by the downlink transmission data, the code word transmission mode corresponding to the downlink transmission data includes:

determining, by the network side device, whether the quantities of transmission layers supported by respective transmission points meet a preset rule if the number of the DMRS port groups occupied by the downlink transmission data is determined to be greater than or equal to 2, where the preset rule is determined by the network side device according to a number of transmission layers of a PDSCH; and determining, by the network side device, the code word transmission mode corresponding to the downlink transmission data is double code word transmission if the quantities of transmission layers supported by the transmission points are determined to meet the preset rule.

In the embodiment of the present application, the network side device also needs to make further judgment if the number of the DMRS port groups occupied by the downlink transmission data is determined to be greater than or equal to 2, and double code word transmission is used if the preset rule determined according to a state of the PDSCH is met.

In one embodiment, the preset rule is that a sum of the quantities of transmission layers supported by the respective transmission points is in a first preset set, where elements in the first preset set are in a value range of $[1, \ldots, RI\_MAX]$, and RI_MAX is a maximum number of transmission layers of the PDSCH; or the preset rule is that a difference between quantities of transmission layers supported by any two of the transmission points is in a second preset set, where elements in the second preset set are in a value range of $[0, \ldots, RI\_MAX]$.

In the embodiment of the present application, the preset rule includes two types. One type is a rule determined according to the sum of the quantities of transmission layers supported by the transmission points and the first preset set, and the other type is a rule determined according to the difference between the quantities of transmission layers supported by the transmission points and the second preset set.

In one embodiment, in the embodiment of the present application, one DMRS port group corresponds to one transmission point, and when the number of the DMRS port groups is determined to be 2, the number of transmission layers corresponding to each DMRS port group is determined.

In one embodiment, the determining, by the network side device, according to the number of the DMRS port groups occupied by the downlink transmission data, a code word transmission mode corresponding to the downlink transmission data includes:

determining, by the network side device, the code word transmission mode corresponding to the downlink transmission data according to the number of transmission layers of a PDSCH if the number of the DMRS port groups occupied by the downlink transmission data is determined to be equal to 1.

In the embodiment of the present application, after determining the current data channel state, the network side device determines the code word transmission mode that can be supported according to the current data channel state.

In one embodiment, the determining, by the network side device, the code word transmission mode corresponding to the downlink transmission data according to the number of transmission layers of the PDSCH includes:

determining, by the network side device, the code word transmission mode corresponding to the downlink transmission data is single code word transmission if the number of the transmission layers of the PDSCH is determined to be any one of 2 to 4; and determining, by the network side device, the code word transmission mode corresponding to the downlink transmission data is double code word transmission if the number of the transmission layers of the PDSCH is determined to be any one of 5 to 8.

In the embodiment of the present application, after determining the number of the transmission layers of the PDSCH, the network side device determines the code word transmission mode according to the corresponding number of the transmission layers.

In one embodiment, after determining, by the network side device, according to the number of the DMRS port groups occupied by the downlink transmission data, the code word transmission mode corresponding to the downlink transmission data, the method further includes:

transferring, by the network side device, the code word transmission mode to the terminal in a signaling or an implicit manner, so that the terminal demodulates the data according to the code word transmission mode.

In the embodiment of the present application, after determining the code word transmission mode, the network side device sends the code word transmission mode to the terminal, and the terminal performs data parsing according to the determined code word transmission mode.

In one embodiment, before the determining, by the network side device, the number of the DMRS port groups occupied by the downlink transmission data sent to the terminal, the method further includes:

determining, by the network side device, that the number of the transmission layers of the PDSCH is greater than 1.

In the embodiment of the present application, if the network side device determines the number of the transmission layers of the PDSCH is equal to 1, which means that the downlink data can only be transmitted on one transmission layer, in this case, it may be transmitted in a code word transmission mode stated in a specification in the related art, i.e. using single code word transmission.

In one embodiment, DMRS ports in each of the DMRS port groups have a QCL relationship.

In the embodiment of the present application, the DMRS ports in each group are in the QCL relationship, which means that large-scale parameters of two or more reference signal channels are consistent.

An embodiment of the present application further provides a transmission method, including:

receiving, by a network side device, a recommendation message reported by a terminal, the recommendation message including a recommended number of DMRS port groups and/or a recommended code word transmission mode, where the recommended number of DMRS port groups and/or the recommended code word transmission mode is determined by the terminal through measuring a downlink signal sent by the network side device via at least one transmission point; and determining, by the network side device, a code word transmission mode of downlink transmission data according to the recommended number of DMRS port groups and/or the recommended code word transmission mode.

In the embodiment of the present application, the network side device determines the code word transmission mode of the downlink transmission data according to the recommended number of DMRS port groups and/or the recommended code word transmission mode reported by the terminal, i.e. the network side device can determine the transmission quality of each transmission point according to the recommended message reported by the terminal, and determine different code word transmission modes according to different transmission qualities, so the code word transmission mode can be determined more flexibly as compared with the related art.

In one embodiment, the determining, by the network side device, the code word transmission mode of the downlink transmission data according to the recommended number of DMRS port groups and/or the recommended code word transmission mode includes:

determining, by the network side device, the code word transmission mode of the downlink transmission data according to the recommended number of DMRS port groups, the recommended code word transmission mode, and an implementation configuration parameter, where the implementation configuration parameter is determined according to the implementation of the network side device.

In the embodiment of the present application, in addition to determining the code word transmission mode according to the recommended number of DMRS port groups and the recommended code word transmission mode, the network side device also needs to determine the code word transmission mode of the downlink transmission data according to different implementations of the network side device.

In one embodiment, the determining, by the network side device, the code word transmission mode of the downlink transmission data according to the recommended number of DMRS port groups, the recommended code word transmission mode, and an implementation configuration parameter includes:

determining, by the network side device, the code word transmission mode of the downlink transmission data and the number of DMRS port groups occupied by the downlink transmission data according to the recommended number of DMRS port groups, the recommended code word transmission mode, and the implementation configuration parameter.

In the embodiment of the present application, in addition to determining the code word transmission mode according to the recommendation message reported by the terminal, the network side device may also determine the number of the DMRS port groups occupied by the downlink transmission data according to the recommendation message.

The present application further provides a transmission method, including:

receiving, by a terminal, a downlink signal sent by a network side device via at least one transmission point;

determining, by the terminal, measurement data according to the downlink signal; and reporting, by the terminal, the measurement data to the network side device, so that the network side device determines a code word transmission mode corresponding to downlink transmission data according to the measurement data.

In the embodiment of the present application, the terminal determines the measurement data according to the downlink signal, and reports the measurement data to the network side device, and the network side device determines the code word transmission mode according to the measurement data, and data transmission may be performed according to the code word transmission mode determined by the network side device. Compared with the prior art, the terminal does not perform transmission according to a code word transmission mode as in an established specification, but performs transmission according to the code word transmission mode determined by the network side device.

In one embodiment, the measurement data includes at least one piece of the following information:
the number of DMRS port groups recommended by the terminal, a code word transmission mode recommended by the terminal, or the number of transmission layers supported by each transmission point.

In the embodiment of the present application, the measurement data reported by the terminal may be the number of transmission layers supported by each transmission point measured by the terminal, or may also be the number of DMRS port groups and a code word transmission mode determined by the terminal, and the terminal reports at least one piece of the above-mentioned information to the network side device, so that the network side device determines the code word transmission mode according to the above-mentioned information.

In one embodiment, the measurement data is the number of transmission layers supported by each transmission point, and the reporting, by the network side device, the measurement data to the network side device includes: adding, by the network side device, the number of transmission layers supported by each transmission point to CSI, and reporting the CSI to the network side device.

In the embodiment of the present application, the terminal adds the measurement data to the CSI, and then reports the CSI to the network side device.

In one embodiment, before the receiving, by the terminal, the downlink signal sent by the network side device via the at least one transmission point, the method further includes:
determining, by the terminal, that the number of transmission layers of a PDSCH is greater than 1.

In the embodiment of the present application, if the network side device determines the number of the transmission layers of the PDSCH is equal to 1, which means that the downlink data can only be transmitted on one transmission layer, in this case, it may be transmitted in a code word transmission mode stipulated in a specification in the related art, i.e. using single code word transmission.

An embodiment of the present application further provides a transmission apparatus, including:
a DMRS port group quantity determination device, configured to determine the number of DMRS port groups occupied by downlink transmission data sent to a terminal, where DMRS ports in each of the DMRS port groups have a QCL relationship; and the downlink transmission data is transmitted to the terminal via at least one transmission point;
a code word transmission mode determination device, configured to determine, according to the number of the DMRS port groups occupied by the downlink transmission data, a code word transmission mode corresponding to the downlink transmission data; and
a data transmission device, configured to perform data processing on the downlink transmission data according to the code word transmission mode, and transmit the processed downlink transmission data via transmission points corresponding to the N DMRS port groups.

In the embodiment of the present application, the code word transmission mode is determined according to the number of the DMRS port groups occupied by the downlink transmission data. By determining, via the number of DMRS port groups actually occupied by a data channel, whether to use single code word transmission or double code word transmission, a more flexible method for determining a code word transmission mode is implemented as compared with a method for determining a code word transmission mode by using a specification in the prior art.

In one embodiment, the DMRS port group quantity determination device is configured to:
determine the number of the DMRS port groups occupied by the downlink transmission data according to at least one piece of the following information:
the number of DMRS port groups recommended by the terminal, a code word transmission mode recommended by the terminal, or the number of transmission layers supported by each transmission point.

In one embodiment, the DMRS port group quantity determination device is further configured to:
receive an uplink signal sent by the terminal to the at least one transmission point; and
measure the uplink signal and determine the number of transmission layers supported by each transmission point.

In one embodiment, the DMRS port group quantity determination device is further configured to:
receive CSI reported by the terminal, the CSI including the number of transmission layers supported by each transmission point, where the number of transmission layers supported by each transmission point is obtained by the terminal through measuring a downlink signal sent by the network side device to the at least one transmission point.

In one embodiment, the DMRS port group quantity determination device is further configured to:
receive a recommendation message reported by the terminal, the recommendation message including the recommended number of DMRS port groups and/or the recommended code word transmission mode, where the recommended number of DMRS port groups and/or the recommended code word transmission mode is determined by the terminal through measuring a downlink signal sent by the network side device to the at least one transmission point.

In one embodiment, the DMRS port group quantity determination device is configured to:
determine the number of the DMRS port groups occupied by the downlink transmission data is 2 if the number of transmission layers supported by each transmission point is greater than or equal to 1; and
determine the number of the DMRS port groups occupied by the downlink transmission data is 1 if the number of transmission layers supported by only one transmission point is greater than or equal to 1.

In one embodiment, the code word transmission mode determination device is configured to:
determine the code word transmission mode corresponding to the downlink transmission data is double code word transmission if the number of the DMRS port groups occupied by the downlink transmission data is determined to be greater than or equal to 2.

In one embodiment, the code word transmission mode determination device is configured to:

determine whether the quantities of transmission layers supported by respective transmission points meet a preset rule if the number of the DMRS port groups occupied by the downlink transmission data is determined to be greater than or equal to 2, the preset rule being determined by the network side device according to the state of a PDSCH; and determine the code word transmission mode corresponding to the downlink transmission data is double code word transmission if the quantities of transmission layers supported by the transmission points are determined to meet the preset rule.

In one embodiment, the preset rule is that the sum of the quantities of transmission layers supported by the transmission points is in a first preset set, where the first preset set is determined by the network side device according to the state of the PDSCH; or the preset rule is that the difference between quantities of transmission layers supported by any two of the transmission points is in a second preset set, where the second preset set is determined according to the number of transmission layers of the PDSCH; and the code word transmission mode corresponding to the downlink transmission data is determined to be double code word transmission if the number of transmission layers supported by each transmission point is determined to meet the preset rule.

In one embodiment, the preset rule is that the sum of the quantities of transmission layers supported by the transmission points is in a first preset set, where elements in the first preset set are in a value range of [1, . . . , RI_MAX], RI_MAX being a maximum number of transmission layers of the PDSCH; or the preset rule is that the difference between quantities of transmission layers supported by any two of the transmission points is in a second preset set, where elements in the second preset set are in a value range of [0, . . . , RI_MAX].

In one embodiment, the code word transmission mode determination device is configured to:

determine the code word transmission mode corresponding to the downlink transmission data according to the number of the transmission layers of the PDSCH if the number of the DMRS port groups occupied by the downlink transmission data is determined to be equal to 1.

In one embodiment, the code word transmission mode determination device is configured to:

determine the code word transmission mode corresponding to the downlink transmission data is single code word transmission if the number of the transmission layers of the PDSCH is determined to be any one of 2 to 4; and determine the code word transmission mode corresponding to the downlink transmission data is double code word transmission if the number of the transmission layers of the PDSCH is determined to be any one of 5 to 8.

In one embodiment, the code word transmission mode determination device is further configured to:

transfer the code word transmission mode to the terminal in a signaling or an implicit manner, so that the terminal demodulates the data according to the code word transmission mode.

In one embodiment, the DMRS port group quantity determination device is further configured to:

determine that the number of the transmission layers of the PDSCH is greater than 1.

In one embodiment, DMRS ports in each of the DMRS port groups have a QCL relationship.

An embodiment of the present application further provides an electronic device, including:

at least one processor; and a memory in communication connection with the at least one processor, where the memory stores instructions executable by the at least one processor, and the instructions are executed by the at least one processor to cause the at least one processor to execute the method of any one of the above-mentioned embodiments.

An embodiment of the present application further provides a non-transitory computer readable storage medium, storing computer instructions, where the computer instructions are configured to cause a computer to execute the method of any one of the above-mentioned embodiments.

An embodiment of the present application further provides a transmission apparatus, including:

a reception device, configured to a receive a recommendation message reported by a terminal, the recommendation message including a recommended number of DMRS port groups and/or a recommended code word transmission mode, where the recommended number of DMRS port groups and/or the recommended code word transmission mode is determined by the terminal through measuring a downlink signal sent by a network side device via at least one transmission point; and a code word transmission mode determination device, configured to determine a code word transmission mode of downlink transmission data according to the recommended number of DMRS port groups and/or the recommended code word transmission mode.

In the embodiment of the present application, the code word transmission mode of the downlink transmission data is determined according to the recommended number of DMRS port groups and/or the recommended code word transmission mode reported by the terminal, i.e. the transmission quality of each transmission point is determined according to the recommended message reported by the terminal, and different code word transmission modes are determined according to different transmission qualities, so the code word transmission mode can be determined more flexibly as compared with the prior art.

In one embodiment, the code word transmission mode determination device is configured to:

determine the code word transmission mode of the downlink transmission data according to the recommended number of DMRS port groups, the recommended code word transmission mode, and an implementation configuration parameter, where the implementation configuration parameter is determined according to the implementation of the network side device.

In one embodiment, the code word transmission mode determination device is configured to:

determine the code word transmission mode of the downlink transmission data and the number of DMRS port groups occupied by the downlink transmission data according to the recommended number of DMRS port groups, the recommended code word transmission mode, and the implementation configuration parameter.

An embodiment of the present application further provides an electronic device, including:

at least one processor; and a memory in communication connection with the at least one processor, where the memory stores instructions executable by the at least one processor, and the instructions are executed by the at least one processor to cause the at least one processor to execute the method of any one of the above-mentioned embodiments.

An embodiment of the present application further provides a non-transitory computer readable storage medium, storing computer instructions, where the computer instructions are configured to cause a computer to execute the method of any one of the above-mentioned embodiments.

An embodiment of the present application further provides a transmission apparatus, including:
  a downlink signal reception device, configured to receive a downlink signal sent by a network side device via at least one transmission point;
  a measurement data determination device, configured to determine measurement data according to the downlink signal; and
  a report device, configured to report the measurement data to the network side device, so that the network side device determines a code word transmission mode corresponding to downlink transmission data according to the measurement data.

In the embodiment of the present application, the measurement data is determined according to the downlink signal, the measurement data is reported to the network side device, the network side device determines the code word transmission mode according to the measurement data, and data transmission may be performed according to the code word transmission mode determined by the network side device. Compared with the prior art, transmission is not performed according to a code word transmission mode stipulated in an established specification, but transmission is performed according to the code word transmission mode determined by the network side device.

In one embodiment, the measurement data includes at least one piece of the following information:
  the number of DMRS port groups recommended by the terminal, a code word transmission mode recommended by the terminal, or the number of transmission layers supported by each transmission point.

In one embodiment, the measurement data is the number of transmission layers supported by each transmission point, and the report device is configured to:
  add the number of transmission layers supported by each transmission point to CSI, and report the CSI to the network side device.

In one embodiment, the measurement data determination device is further configured to:
  determine that the number of the transmission layers of the PDSCH is greater than 1.

An embodiment of the present application further provides an electronic device, including:
  at least one processor; and a memory in communication connection with the at least one processor, where the memory stores instructions executable by the at least one processor, and the instructions are executed by the at least one processor to cause the at least one processor to execute the method of any one of the above-mentioned embodiments.

An embodiment of the present application further provides a non-transitory computer readable storage medium, storing computer instructions, where the computer instructions are configured to cause a computer to execute the method of any one of the above-mentioned embodiments.

BRIEF DESCRIPTION OF THE DRAWINGS

The embodiments of the present application are described more clearly, drawings that need to be used in description of the embodiments will be introduced briefly below. The drawings described below are merely some embodiments of the present application.

DETAILED DESCRIPTION OF THE EMBODIMENTS

Embodiments of the present application will be further described in detail below in conjunction with the accompanying drawings. Embodiments described are part of embodiments of the present application, and not all the embodiments.

Figure 1:
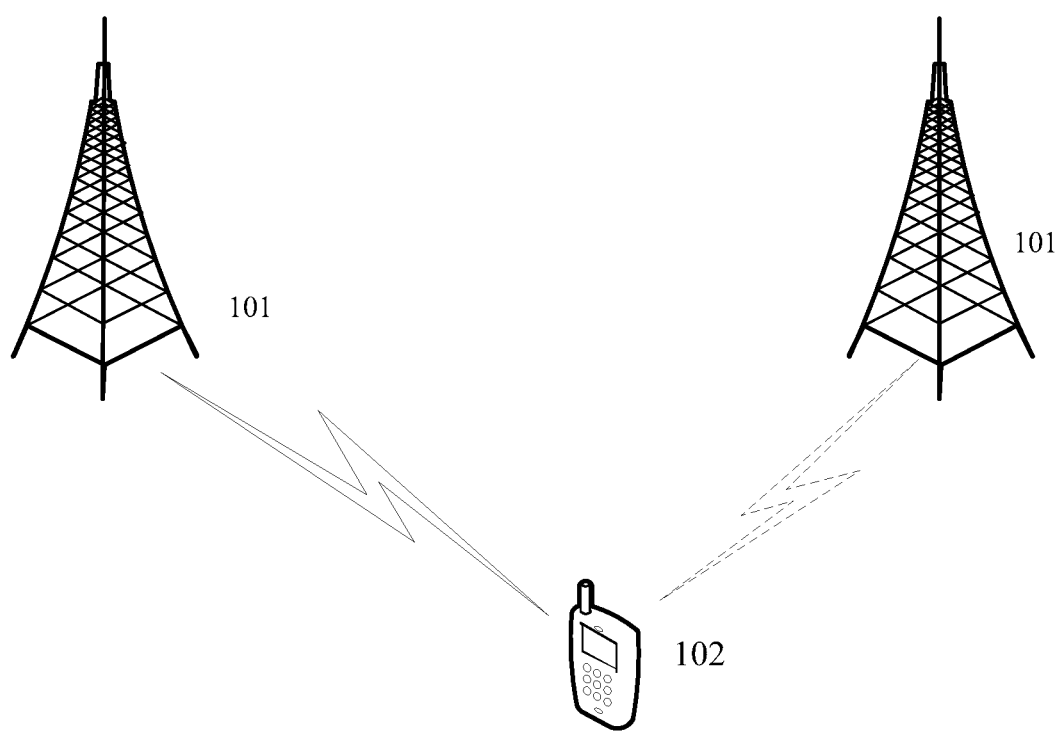
FIG. 1 is a structural diagram of a communication architecture provided by an embodiment of the present application.

See FIG. 1, which is a network structure diagram applied in embodiments of the present application; as shown in FIG. 1, the network structure includes network side devices 101 and a terminal 102. Each network side device 101 may be an evolved base station (eNB, evolved Node B) or other base station. It should be noted that the specific type of the network side device 101 is not limited in the embodiments of the present application. The network side device 101 may establish communication with the terminal 102. The terminal 102 may be a terminal device such as a mobile phone, a tablet personal computer, a laptop computer, a Personal Digital Assistant (PDA), a Mobile Internet Device (MID) or a wearable device. It should be noted that the specific type of the terminal 102 is not limited in the embodiments of the present application.

Figure 2:
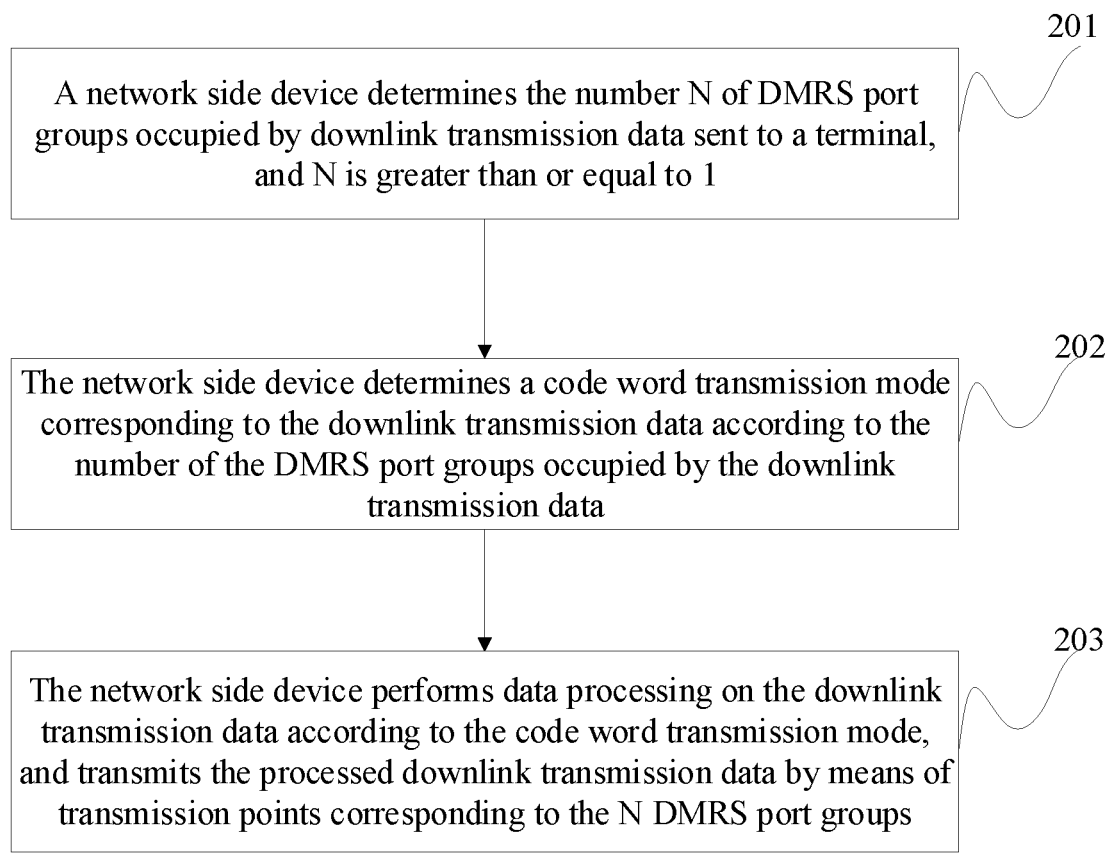
FIG. 2 is a flow diagram of a transmission method provided by an embodiment of the present application.

Based on the structure in FIG. 1, an embodiment of the present application provides a transmission method, as shown in FIG. 2, including the following.

In step 201, a network side device determines the number N of DMRS port groups occupied by downlink transmission data sent to a terminal, and N is greater than or equal to 1.

In step 202, the network side device determines a code word transmission mode corresponding to the downlink transmission data according to the number of the DMRS port groups occupied by the downlink transmission data.

In step 203, the network side device performs data processing on the downlink transmission data according to the code word transmission mode, and transmits the processed downlink transmission data via transmission points corresponding to the N DMRS port groups.

In the embodiment of the present application, the network side device performs data transmission with the terminal via at least one transmission point. In one embodiment, in the embodiment of the present application, each transmission point may be a coordinated TRP or may be a coordinated antenna panel.

In the embodiment of the present application, in the case of coordinated transmission via multiple TRPs/panels, signals sent by different TRPs/panels may have relatively independent large-scale features, such as average delay, delay spread, average Doppler shift, Doppler spread, and airspace reception parameter. Therefore, in a NR system, if large-scale parameters of two or more reference signal channels are consistent, it is called Quasi-Co-Location (QCL). Otherwise, it is called non-QCL.

In one embodiment, in the embodiment of the present application, DMRS ports in each of the DMRS port groups have a QCL relationship, i.e. the DMRS ports in a DMRS port group are in the QCL relationship.

In one embodiment, in the embodiment of the present application, DMRS ports in the same CDM group also have a QCL relationship.

In one embodiment, in the embodiment of the present application, each data channel supports at most two DMRS port groups.

In one embodiment, in the embodiment of the present application, one DMRS port group may perform transmission via one transmission point, or may also perform transmission via two transmission points, and the DMRS ports corresponding to the two transmission points also have a QCL relationship.

In the embodiment of the present application, the network side device determines the code word transmission mode according to the number of the DMRS port groups occupied by the downlink transmission data. In one embodiment, in the embodiment of the present application, there are two code word transmission modes: single code word transmission, and double code word transmission.

In the embodiment of the present application, during downlink transmission, the network side device allocates a number of parallel data streams to each scheduled terminal, and each data stream is called a layer. After the code word transmission mode is determined, each code word to be transmitted is mapped to at least one data layer, and is transmitted through the at least one data layer.

In one embodiment, in the embodiment of the present application, one downlink data transmission channel supports at most 8 layers of data transmission.

In one embodiment, in the embodiment of the present application, before determining the code word transmission mode corresponding to the downlink transmission data, it also needs to determine the number of transmission layers that a downlink data transmission channel can support; In one embodiment, in the embodiment of the present application, the downlink data transmission channel is a PDSCH.

In the embodiment of the present application, both the network side device and the terminal device can determine the number of transmission layers supported by the PDSCH. In one embodiment, the network side device and the terminal device determine the number of transmission layers supported by the PDSCH according to the channel quality of the PDSCH.

If the number of transmission layers supported by the PDSCH determined by the network side device or the terminal device is 1, which means that the downlink data can only be transmitted on one transmission layer, in this case, it may be transmitted in a code word transmission mode stipulated in a specification in the prior art, i.e. using single code word transmission.

If the number of transmission layers supported by the PDSCH determined by the network side device or the terminal device is greater than 1, the network side device then determines the number of the DMRS port groups, and determines the code word transmission mode according to the number.

In one embodiment, in the embodiment of the present application, the network side device may determine the number of the DMRS port groups occupied by the downlink transmission data according to at least one piece of the following information:

the number of DMRS port groups recommended by the terminal;

a code word transmission mode recommended by the terminal; or the number of transmission layers supported by each transmission point.

In one embodiment, in the embodiment of the present application, the number of the DMRS port groups recommended by the terminal is determined by the terminal through measuring a downlink signal sent by the network side device via the at least one transmission point; the code word transmission mode recommended by the terminal is determined by the terminal through measuring a downlink signal sent by the network side device via the at least one transmission point; and the number of transmission layers supported by each transmission point may be determined by the terminal, or may also be determined by the network side device.

In one embodiment, in the embodiment of the present application, the terminal may determine the number of transmission layers supported by each transmission point based on measurement data obtained by measuring a downlink signal sent by the network side device via the at least one transmission point, and report the number of the transmission layers.

In one embodiment, in the embodiment of the present application, the terminal adds the number of transmission layers supported by each transmission point to the CSI, and reports the CSI to the network side device.

After receiving the CSI from the terminal, the network side device determines the number of transmission layers supported by each transmission point.

In one embodiment, in the embodiment of the present application, the network side device receives an uplink signal sent by the terminal via at least one transmission point; and determines the number of transmission layers supported by each transmission point according to measurement data of the uplink signal.

In one embodiment, in the embodiment of the present application, the number of transmission layers supported by each transmission point determined by the network side device may be different from the number of transmission layers supported by each transmission point determined by the terminal.

In one embodiment, in the embodiment of the present application, solutions for the network side device to determine the number of the DMRS port groups occupied by the downlink transmission data according to at least one piece of information are as follows.

A. The network side device determines the number of the DMRS port groups occupied by the downlink transmission data according to the number of the DMRS port groups recommended by the terminal.

B. The network side device determines the number of the DMRS port groups occupied by the downlink transmission data according to the code word transmission mode recommended by the terminal.

C. The network side device determines the number of the DMRS port groups occupied by the downlink transmission data according to the determined number of transmission layers supported by each transmission point.

D. The network side device determines the number of the DMRS port groups occupied by the downlink transmission data according to a combination of any two pieces of the above-mentioned three pieces of information.

E. The network side device determines the number of the DMRS port groups occupied by the downlink transmission data according to a combination of the above-mentioned three pieces of information.

In one embodiment, in the embodiment of the present application, in addition to determining the number of the DMRS port groups occupied by the downlink transmission data according to at least one piece of the above-mentioned three pieces of information, the network side device also needs to determine the number of the DMRS port groups occupied by the downlink transmission data according to other information.

In one embodiment, in the embodiment of the present application, the other information may be reference information corresponding to the implementation on the network side. For example, if the implementation on the network side is to achieve a more reliable transmission mode, the reference information corresponding to the implementation may be determined, and the reference information is also used as information for determining the number of the DMRS port groups occupied by the downlink transmission data.

In the embodiment of the present application, after the network side device determines the above-mentioned information, the network side device may determine the number of the DMRS port groups occupied by the downlink transmission data according to at least one piece of the above-mentioned information.

In one embodiment, the number of the DMRS port groups occupied by the downlink transmission data is determined to be greater than or equal to 2 if the network side device determines that the number of transmission layers supported by each transmission point is greater than or equal to 1 according to the above information; and the number of the DMRS port groups occupied by the downlink transmission data is determined to be 1 if the network side device determines that the number of transmission layers supported by only one transmission point is greater than or equal to 1.

In one embodiment, in the embodiment of the present application, after the network side device determines that the number of the DMRS port groups is 1, it may perform determination according to a method of determining a code word transmission mode in the related art. For example, when the number of the layers that can be supported by the PDSCH determined by the network side device is any one of 2 to 4, then the code word transmission mode corresponding to the downlink transmission data is determined to be single code word transmission; and if the number of the transmission layers that can be supported by the PDSCH determined by the network side device is any one of 5 to 8, then the code word transmission mode corresponding to the downlink transmission data is determined to be double code word transmission.

When the network side device determines that the number of the DMRS port groups occupied by the downlink transmission data is greater than or equal to 2, In one embodiment, the network side device may have two methods for determining the code word transmission mode, which are respectively as follows, using the number of the DMRS port groups being equal to 2 as an example:

in a first method, the network side device directly determines to use a double code word transmission mode; and in a second method, the network side device determines whether the number of transmission layers supported by each transmission point meets a preset rule, the preset rule is determined by the network side device according to a state of the PDSCH; if the network side device determines the number of transmission layers supported by each transmission point meets the preset rule, the code word transmission mode corresponding to the downlink transmission data is determined to be double code word transmission; otherwise, the code word transmission mode corresponding to the downlink transmission data is determined to be single code word transmission.

In one embodiment, in the embodiment of the present application, the preset rule is determined according to the state of the PDSCH, that is, the preset rule is determined according to the number of the transmission layers determined by the state of the PDSCH.

In one embodiment, in the embodiment of the present application, the preset rule is that a sum of the quantities of transmission layers supported by respective transmission points is in a first preset set, where the first preset set is determined by the network side device according to the state of the PDSCH; or the preset rule is that a difference between the quantities of transmission layers supported by any two of the respective transmission points is in a second preset set, where the second preset set is determined by the network side device according to the state of the PDSCH.

Figure 3:
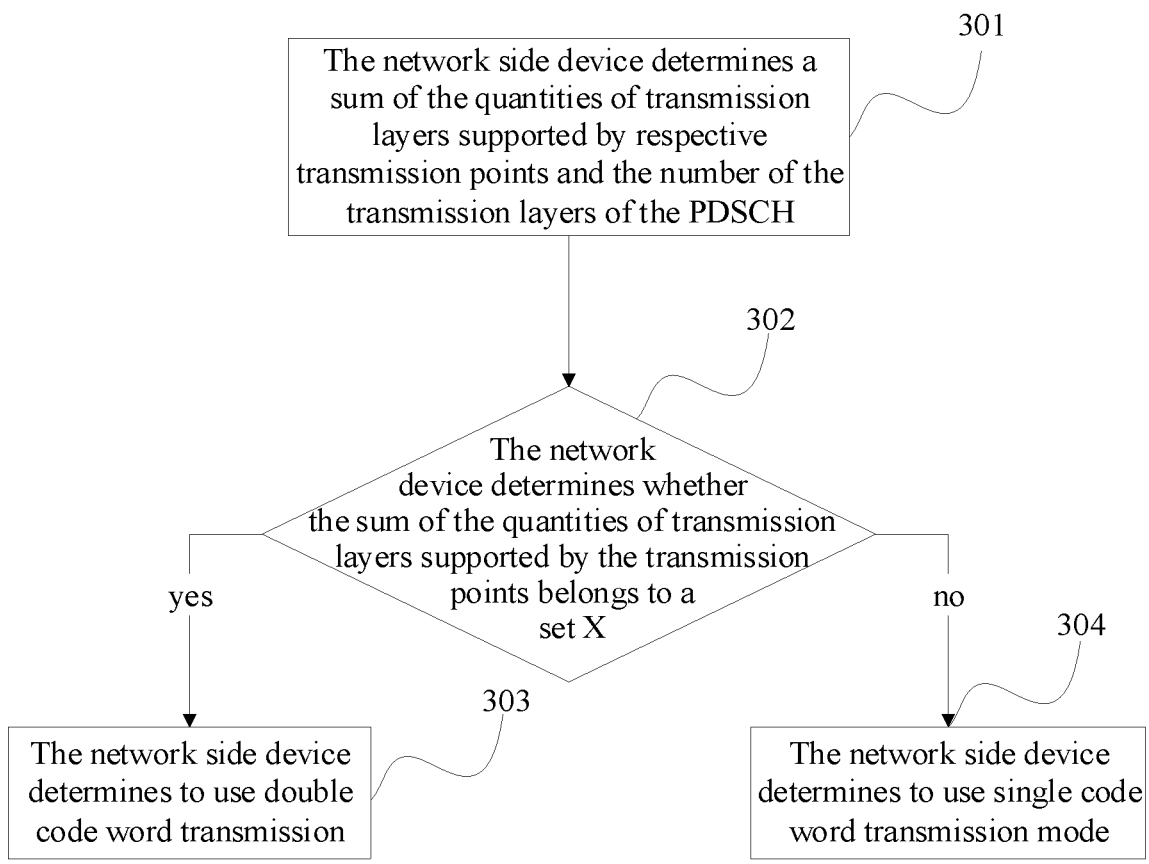
FIG. 3 is a flow diagram of a method for determining a code word transmission mode provided by an embodiment of the present application.

For example, in the embodiment of the present application, for the first preset rule, the sum of the quantities of transmission layers supported by the respective transmission points and the first preset set are determined firstly. The first preset set is determined according to the number of the transmission layers of the PDSCH. To understand the first preset rule more clearly, an example is provided here for illustration, as shown in FIG. 3.

In step 301, the network side device determines a sum of the quantities of transmission layers supported by respective transmission points and the number of the transmission layers of the PDSCH.

In step 302: the network device determines whether the sum of the quantities of transmission layers supported by the respective transmission points belongs to a set X; if it belongs to X, step 303 is executed; otherwise, step 304 is executed.

In step 303, the network side device determines to use double code word transmission.

In step 304, the network side device determines to use single code word transmission mode.

In the above example, the set X is predefined, elements in the set X are positive integers from 1 to RI_MAX, and RI_MAX is a maximum value of the number of the transmission layers of the PDSCH.

Figure 4:
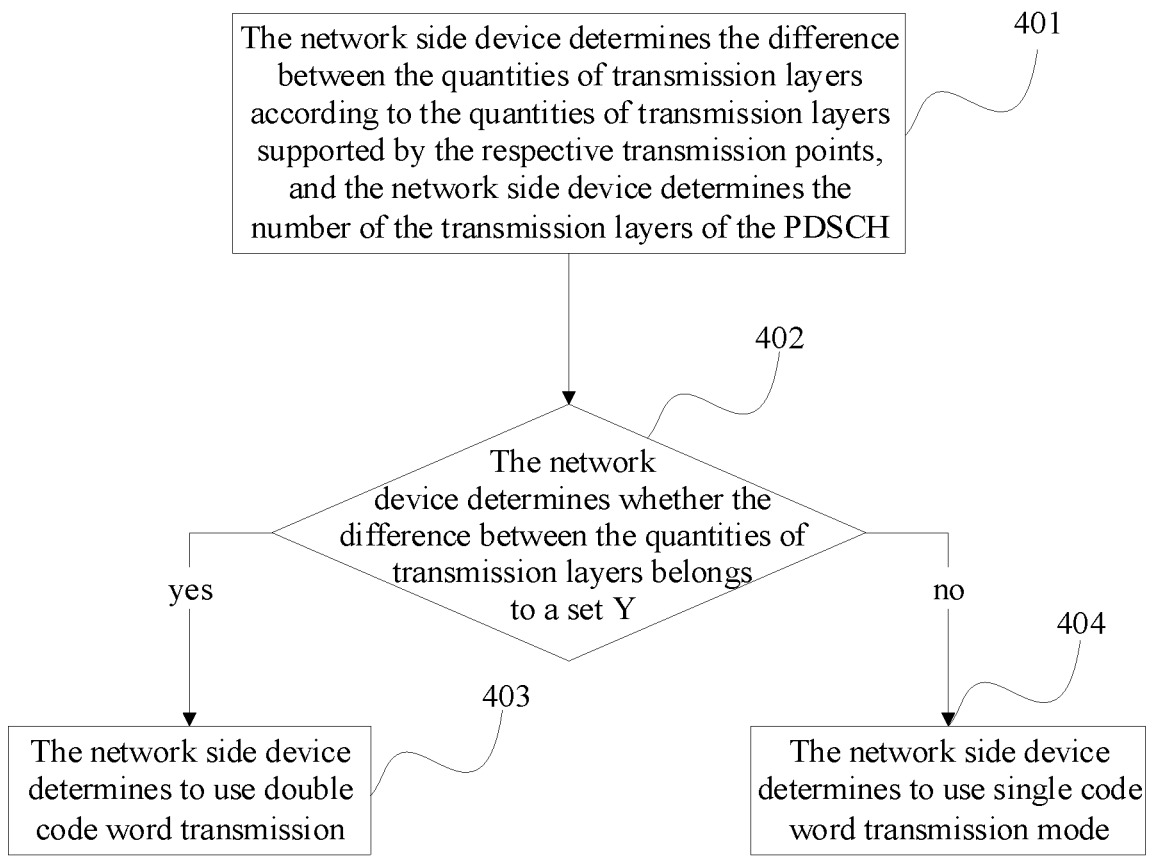
FIG. 4 is a flow diagram of a method for determining a code word transmission mode provided by an embodiment of the present application.

In one embodiment, in the embodiment of the present application, for the second preset rule, the difference between the quantities of transmission layers supported by any two of the respective transmission points and the second preset set are determined firstly. The second preset set is determined according to the number of the transmission layers of the PDSCH. To understand the second preset rule more clearly, an example is provided here for illustration, as shown in FIG. 4.

In step 401, the network side device determines the difference between the quantities of transmission layers according to the quantities of transmission layers supported by the respective transmission points, and the network side device determines the number of the transmission layers of the PDSCH.

In step 402: the network device determines whether the difference between the quantities of transmission layers belongs to a set Y; if it belongs to Y, step 403 is executed; otherwise, step 404 is executed.

In step 403, the network side device determines to use double code word transmission.

In step 404, the network side device determines to use single code word transmission mode.

In the above example, the set Y is predefined, elements in the set Y are positive integers from 1 to RI_MAX, and RI_MAX is a maximum value of the number of the transmission layers of the PDSCH.

In one embodiment, in the embodiment of the present application, after the network side device determines the code word transmission mode, the network side device transfers the code word transmission mode to the terminal in a signaling or implicit manner; and after receiving the code word transmission mode, the terminal determines a data demodulating mode to receive the downlink data.

To better explain embodiments of the present application, a transmission method provided by embodiments of the present application is described by using a specific implementation scenario.

Figure 5:
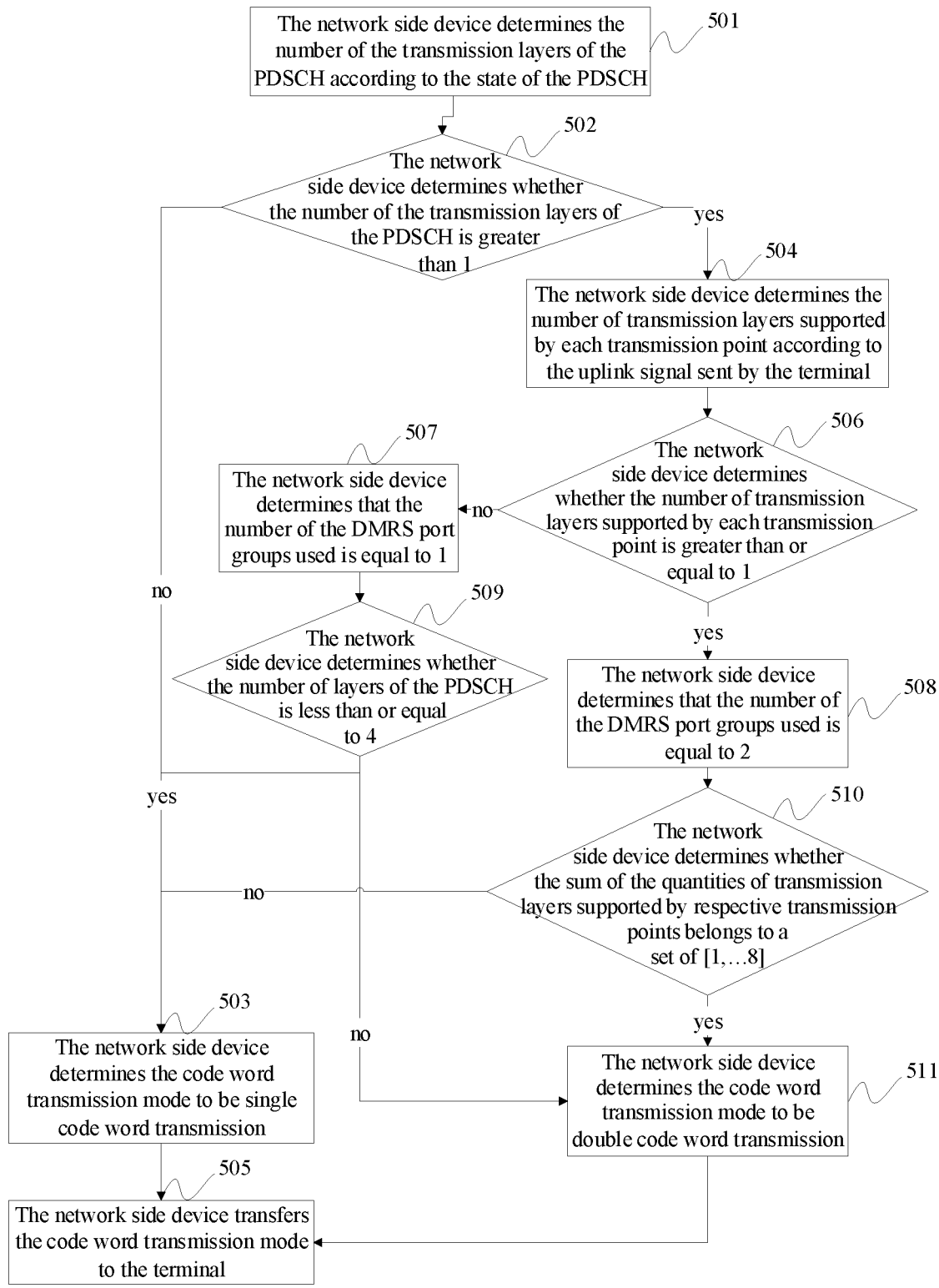
FIG. 5 is a flow diagram of a transmission method provided by an embodiment of the present application.

In the embodiment of the present application, the network side device determines the number of transmission layers supported by each transmission point according to an uplink signal sent by the terminal, and if the network side device determines that the number of the DMRS port groups occupied by the downlink transmission data is equal to 2, the first preset rule is used to determine the code word transmission mode. In the first rule, a maximum value in the set X is 8. Specific steps are shown in FIG. 5.

In step 501, the network side device determines the number of the transmission layers of the PDSCH according to the state of the PDSCH.

In step 502: the network side device determines whether the number of the transmission layers of the PDSCH is greater than 1; if it is greater than 1, step 504 is executed; otherwise, step 503 is executed.

In step 503, the network side device determines the code word transmission mode to be single code word transmission, and step 505 is executed.

In step 504: the network side device determines the number of transmission layers supported by each transmission point according to the uplink signal sent by the terminal, and step 506 is executed.

In step 505: the network side device transfers the code word transmission mode to the terminal.

In step 506: the network side device determines whether the number of transmission layers supported by each transmission point is greater than or equal to 1; if so, step 508 is executed; otherwise, step 507 is executed.

In step 507: the network side device determines that the number of the DMRS port groups used is equal to 1, and step 509 is executed.

In step 508: the network side device determines that the number of the DMRS port groups used is equal to 2, and step 510 is executed.

In step 509: the network side device determines whether the number of layers of the PDSCH is less than or equal to 4; if so, step 503 is executed; otherwise, step 511 is executed.

In step 510: the network side device determines whether the sum of the quantities of transmission layers supported by respective transmission points belongs to a set of [1, . . . 8]; if so, step 511 is executed; otherwise, step 503 is executed.

In step 511, the network side device determines the code word transmission mode to be double code word transmission, and step 505 is executed.

In one embodiment, in the embodiment of the present application, when the number of the DMRS port groups is determined to be greater than or equal to 3, a code word mapping mode may also be determined according to the foregoing method, which is not repeated here.

Figure 6:
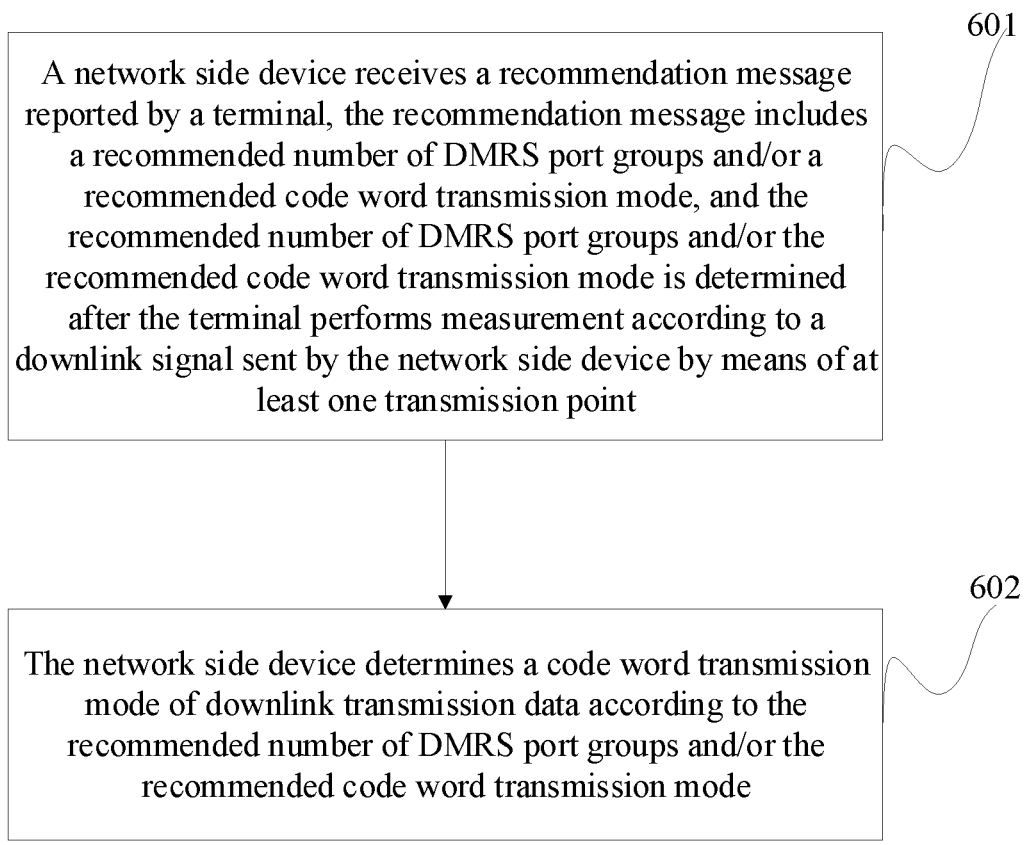
FIG. 6 is a flow diagram of a transmission method provided by an embodiment of the present application.

Based on the structure in FIG. 1, an embodiment of the present application further provides a transmission method, as shown in FIG. 6, including the following.

In step 601, a network side device receives a recommendation message reported by a terminal, the recommendation message includes a recommended number of DMRS port groups and/or a recommended code word transmission mode, and the recommended number of DMRS port groups and/or the recommended code word transmission mode is determined by the terminal through measuring a downlink signal sent by the network side device via at least one transmission point.

In step 602, the network side device determines a code word transmission mode of downlink transmission data according to the recommended number of DMRS port groups and/or the recommended code word transmission mode.

In one embodiment, in an embodiment of the present application, the network side device may determine the code word transmission mode according to the following three modes.

Mode I: the network side device determines the code word transmission mode according to the number of the DMRS port groups recommended by the terminal.

Mode II: the network side device determines the code word transmission mode according to the code word transmission mode recommended by the terminal.

Mode III: the network side device determines the code word transmission mode according to the code word transmission mode recommended by the terminal and the number of the DMRS port groups recommended by the terminal.

In one embodiment, in the embodiment of the present application, for the mode I, the network side device further determines whether to use single code word transmission or double code word transmission according to the number of the DMRS port groups recommended by the terminal.

For example, if the network side device determines that the number of the DMRS port groups recommended by the terminal is equal to 1, the code word transmission mode is determined to be single code word transmission. When the network side device determines that the number of the DMRS port groups recommended by the terminal is equal to 2, a first determination method is that the network side device directly determines to use a double code word transmission mode; and a second determination method is that the network side device determines whether the number of transmission layers supported by each transmission point meets a preset rule, the preset rule is determined by the network side device according to a state of the PDSCH; and if the network side device determines the number of transmission layers supported by each transmission point meets the preset rule, the code word transmission mode corresponding to the downlink transmission data is determined to be double code word transmission; otherwise, the code word transmission mode corresponding to the downlink transmission data is determined to be single code word transmission.

Similarly, in the modes II and III, the above-mentioned determination methods may be used if the network side device determines the number of the DMRS port groups according to the code word transmission mode recommended by the terminal, or the network side device determines the number of the DMRS port groups according to the code word transmission mode recommended by the terminal and the number of the DMRS port groups recommended by the terminal, and determines the code word transmission mode according to the number of the DMRS port groups.

That is to say, in the embodiment of the present application, the network side device not only can determine the code word transmission mode, but also can determine the number of the DMRS port groups, according to the recommendation message. For example, the network side device determines, according to the recommendation message, to perform downlink data transmission with one code word/ two DMRS port groups, or perform downlink data transmission with double code words/two DMRS port groups, or perform downlink data transmission with double code words/one DMRS port group, or perform downlink data transmission with one code word/one DMRS port group.

In the embodiment of the present application, the network side device directly determines the code word transmission mode according to at least one of recommendation messages reported by the receiving terminal. In one embodiment, in step 602, the network side device determines the code word transmission mode of the downlink transmission data according to the recommended number of DMRS port groups, the recommended code word transmission mode, and an implementation configuration parameter. The implementation configuration parameter is determined according to the implementation of the network side device.

In one embodiment, in the embodiment of the present application, the implementation configuration parameter is reference information corresponding to the implementation on the network side. For example, if the implementation is reliable transmission, the configuration parameter is reference information corresponding to the reliable transmission.

Figure 7:
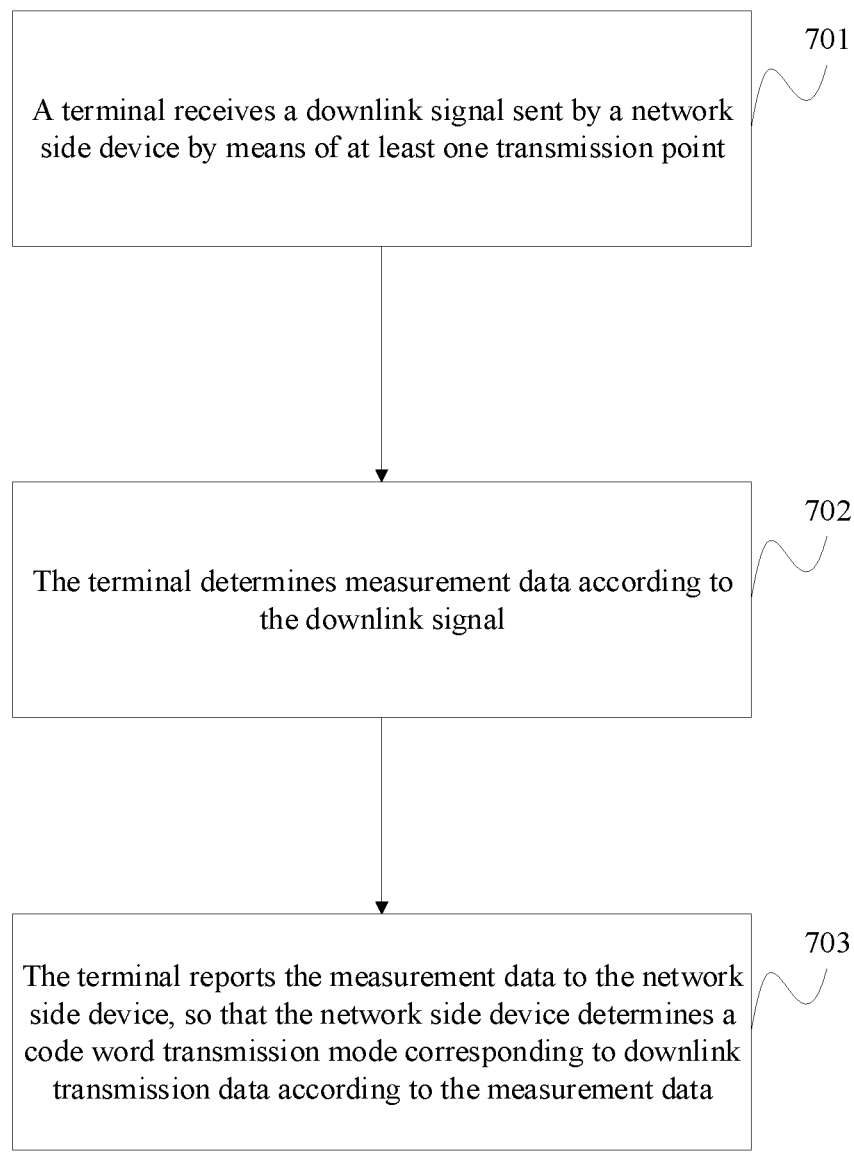
FIG. 7 is a flow diagram of a transmission method provided by an embodiment of the present application.

Based on the structure in FIG. 1, an embodiment of the present application provides a transmission method, as shown in FIG. 7, including the following.

In step 701, a terminal receives a downlink signal sent by a network side device via at least one transmission point.

In step 702, the terminal determines measurement data according to the downlink signal.

In step 703, the terminal reports the measurement data to the network side device, so that the network side device determines a code word transmission mode corresponding to downlink transmission data according to the measurement data.

In one embodiment, in the embodiment of the present application, if the number of transmission layers supported by the PDSCH determined by the terminal device is 1, which means that the PDSCH channel quality is poor, and as the corresponding feedback and control overhead and complexity are relatively low during single code word transmission, it may be determined to use a single code word transmission mode.

In one embodiment, in step 701, the terminal receives, through a downlink data transmission channel, the downlink signal sent by the network side device.

In one embodiment, in step 702, the measurement data includes at least one piece of the following information:
the number of DMRS port groups recommended by the terminal, a code word transmission mode recommended by the terminal, or the number of transmission layers supported by each transmission point.

In one embodiment, in step 703, after the terminal determines the measurement data, the measurement data is added to the CSI, and is reported through the CSI.

Figure 8:
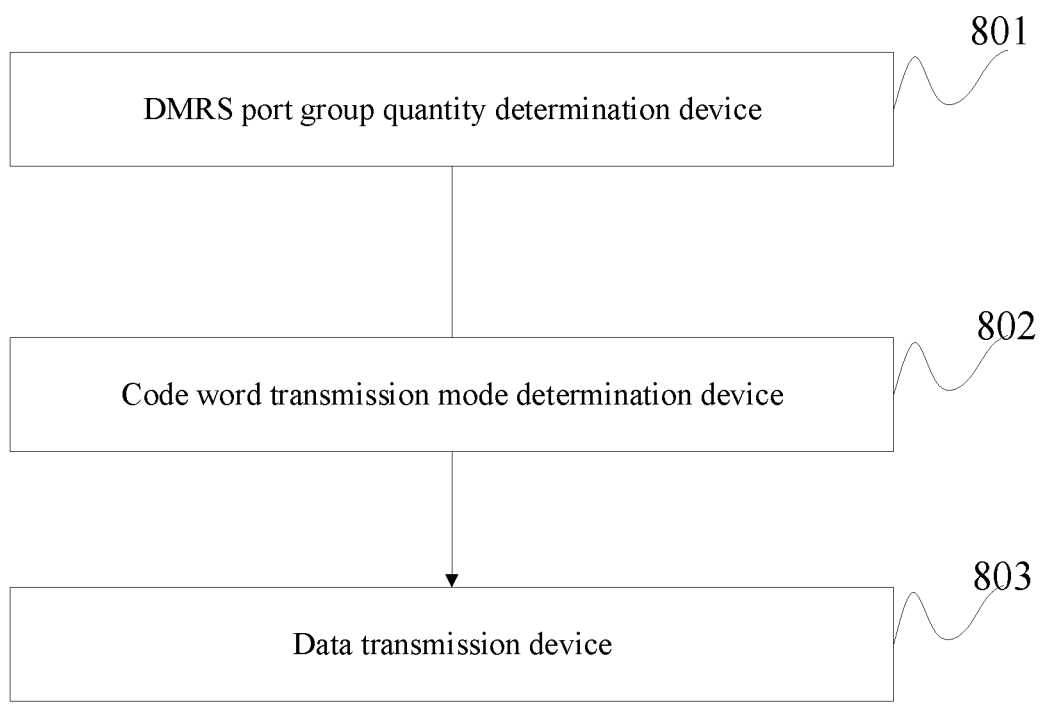
FIG. 8 is a structural diagram of a transmission apparatus provided by an embodiment of the present application.

Based on the same concept, an embodiment of the present application further provides a transmission apparatus, as shown in FIG. 8, including:
a DMRS port group quantity determination device 801, configured to determine the number N of DMRS port groups occupied by downlink transmission data sent to a terminal, N being greater than or equal to 1;
a code word transmission mode determination device 802, configured to determine, according to the number of the DMRS port groups occupied by the downlink transmission data, a code word transmission mode corresponding to the downlink transmission data; and
a data transmission device 803, configured to perform data processing on the downlink transmission data according to the code word transmission mode, and transmit the processed downlink transmission data via transmission points corresponding to the N DMRS port groups.

In one embodiment, the DMRS port group quantity determination device 801 is configured to:
determine the number of the DMRS port groups occupied by the downlink transmission data according to at least one piece of the following information:
the number of DMRS port groups recommended by the terminal, a code word transmission mode recommended by the terminal, or the number of transmission layers supported by each transmission point.

In one embodiment, the DMRS port group quantity determination device 801 is further configured to:
receive an uplink signal sent by the terminal via the at least one transmission point; and
measure the uplink signal and determine the number of transmission layers supported by each transmission point.

In one embodiment, the DMRS port group quantity determination device 801 is further configured to:
receive CSI reported by the terminal, where the CSI includes the number of transmission layers supported by each transmission point, and the number of transmission layers supported by each transmission point is obtained by the terminal through measuring a downlink signal sent by the network side device to at least one transmission point.

In one embodiment, the DMRS port group quantity determination device 801 is further configured to:
receive a recommendation message reported by the terminal, the recommendation message including the recommended number of DMRS port groups and/or the recommended code word transmission mode, where the recommended number of DMRS port groups and/or the recommended code word transmission mode is determined by the terminal through measuring a downlink signal sent by the network side device to the at least one transmission point.

In one embodiment, the DMRS port group quantity determination device 801 is configured to:
  determine the number of the DMRS port groups occupied by the downlink transmission data is 2 if the number of transmission layers supported by each transmission point is greater than or equal to 1; and
  determine the number of the DMRS port groups occupied by the downlink transmission data is 1 if the number of transmission layers supported by only one transmission point is greater than or equal to 1.

In one embodiment, the code word transmission mode determination device 802 is configured to:
  determine the code word transmission mode corresponding to the downlink transmission data is double code word transmission if the number of the DMRS port groups occupied by the downlink transmission data is determined to be equal to 2.

In one embodiment, the code word transmission mode determination device 802 is configured to:
  determine whether the quantities of transmission layers supported by respective transmission points meet a preset rule if the number of the DMRS port groups occupied by the downlink transmission data is determined to be equal to 2, the preset rule being determined by the network side device according to the number of transmission layers of a PDSCH; and
  determine the code word transmission mode corresponding to the downlink transmission data is double code word transmission if the number of transmission layers supported by each transmission point is determined to meet the preset rule.

In one embodiment, the preset rule is that the sum of the quantities of transmission layers supported by the transmission points is in a first preset set, where elements in the first preset set are in a value range of [1, . . . , RI_MAX], RI_MAX being a maximum number of transmission layers of the PDSCH; or
  the preset rule is that the difference between quantities of transmission layers supported by any two of the transmission points is in a second preset set, where elements in the second preset set are in a value range of [0, . . . , RI_MAX].

In one embodiment, the code word transmission mode determination device 802 is configured to:
  determine the code word transmission mode corresponding to the downlink transmission data according to the number of the transmission layers of the PDSCH if the number of the DMRS port groups occupied by the downlink transmission data is determined to be equal to 1.

In one embodiment, the code word transmission mode determination device 802 is configured to:
  determine the code word transmission mode corresponding to the downlink transmission data is single code word transmission if the number of the transmission layers of the PDSCH is determined to be any one of 2 to 4; and
  determine the code word transmission mode corresponding to the downlink transmission data is double code word transmission if the number of the transmission layers of the PDSCH is determined to be any one of 5 to 8.

In one embodiment, the code word transmission mode determination device 802 is further configured to:
  transfer the code word transmission mode to the terminal in a signaling or an implicit manner, so that the terminal demodulates the data according to the code word transmission mode.

In one embodiment, the DMRS port group quantity determination device 801 is further configured to:
  determine that the number of the transmission layers of the PDSCH is greater than 1.

In one embodiment, DMRS ports in each of the DMRS port groups have a QCL relationship.

Figure 9:
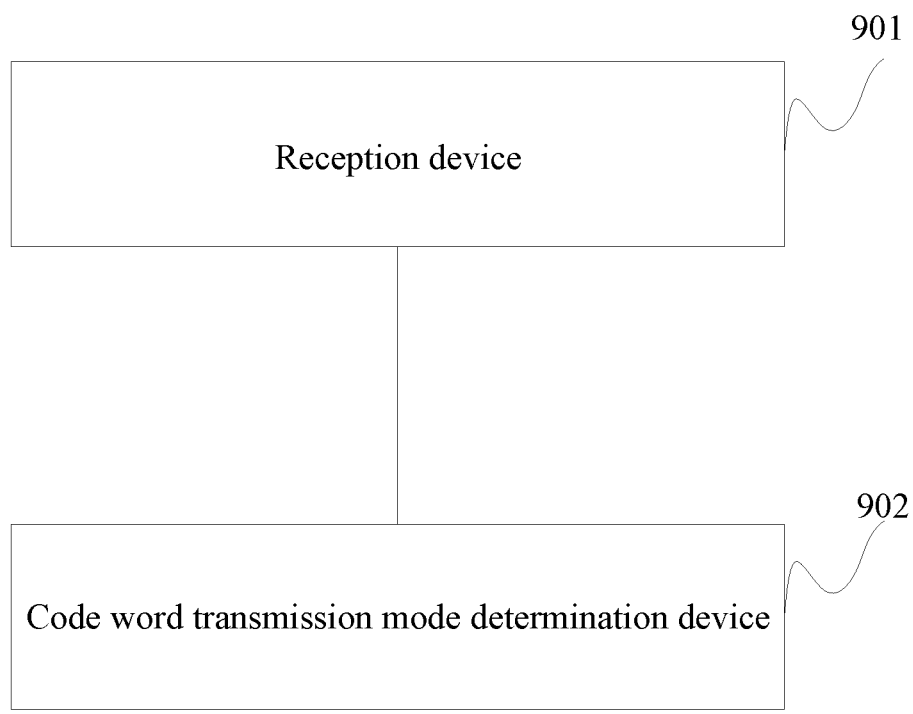
FIG. 9 is a structural diagram of a transmission apparatus provided by an embodiment of the present application.

Based on the same concept, an embodiment of the present application further provides a transmission apparatus, as shown in FIG. 9, including:
  a reception device 901, configured to a receive a recommendation message reported by a terminal, the recommendation message including a recommended number of DMRS port groups and/or a recommended code word transmission mode, where the recommended number of DMRS port groups and/or the recommended code word transmission mode is determined by the terminal through measuring a downlink signal sent by a network side device via at least one transmission point; and
  a code word transmission mode determination device 902, configured to determine a code word transmission mode of downlink transmission data according to the recommended number of DMRS port groups and/or the recommended code word transmission mode.

In one embodiment, the code word transmission mode determination device 902 is configured to:
  determine the code word transmission mode of the downlink transmission data according to the recommended number of DMRS port groups, the recommended code word transmission mode, and an implementation configuration parameter, where the implementation configuration parameter is determined according to the implementation of the network side device.

In one embodiment, the code word transmission mode determination device 902 is configured to:
  determine the code word transmission mode of the downlink transmission data and the number of DMRS port groups occupied by the downlink transmission data according to the recommended number of DMRS port groups, the recommended code word transmission mode, and the implementation configuration parameter.

Figure 10:
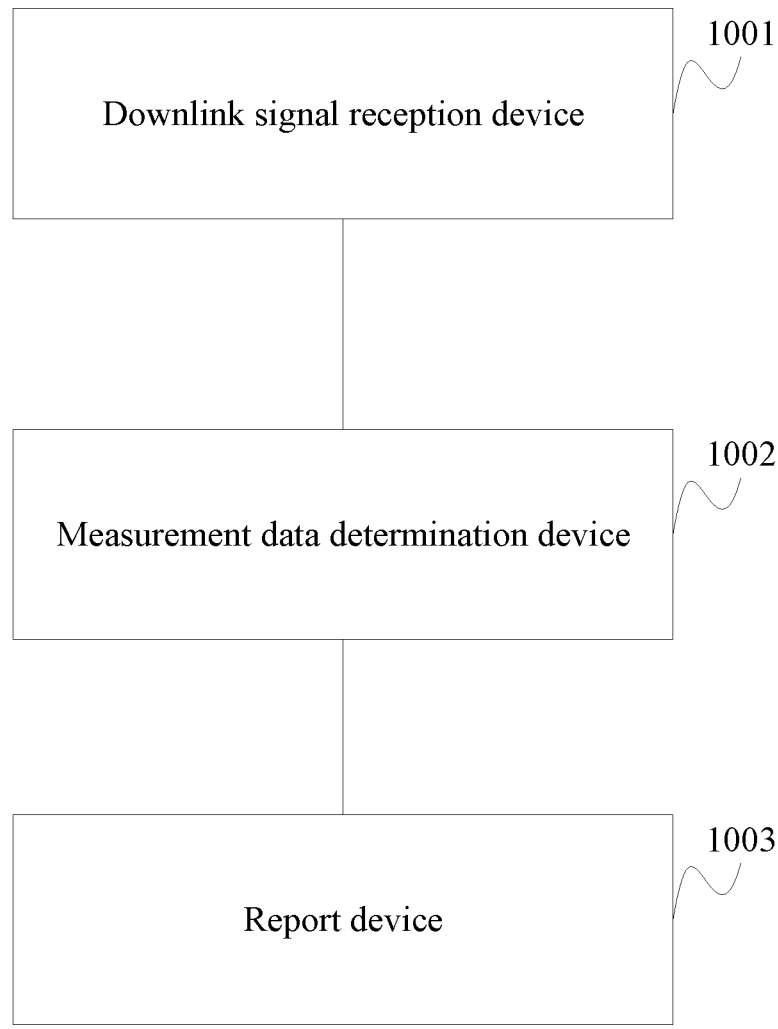
FIG. 10 is a structural diagram of a transmission apparatus provided by an embodiment of the present application.

Based on the same concept, an embodiment of the present application further provides a transmission apparatus, as shown in FIG. 10, including:
  a downlink signal reception device 1001, configured to receive a downlink signal sent by a network side device via at least one transmission point;
  a measurement data determination device 1002, configured to determine measurement data according to the downlink signal; and
  a report device 1003, configured to report the measurement data to the network side device, so that the network side device determines a code word transmission mode corresponding to downlink transmission data according to the measurement data.

In one embodiment, the measurement data includes at least one piece of the following information:
  the number of DMRS port groups recommended by the terminal, a code word transmission mode recommended by the terminal, or the number of transmission layers supported by each transmission point.

In one embodiment, the measurement data is the number of transmission layers supported by each transmission point, and the report device 1003 is configured to:
   add the number of transmission layers supported by each transmission point to CSI, and report the CSI to the network side device.

In one embodiment, the measurement data determination device 1002 is further configured to:
   determine that the number of the transmission layers of the PDSCH is greater than 1.

Figure 11:
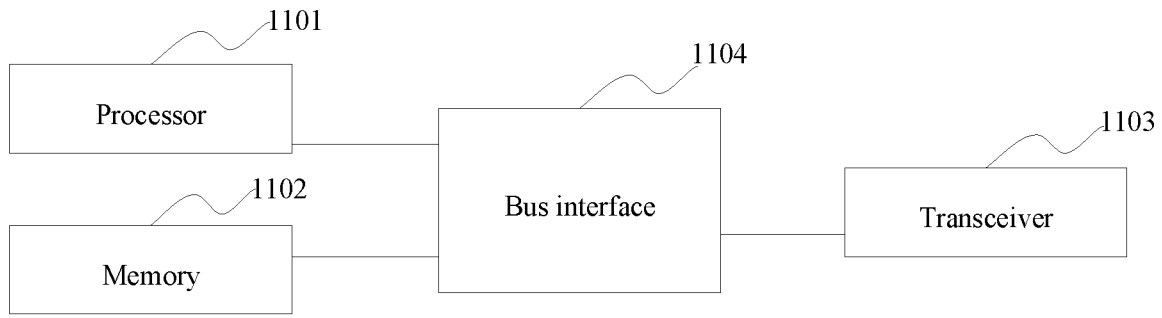
FIG. 11 is a structural diagram of an electronic device provided by an embodiment of the present application.

Based on the same principle, the present application further provides an electronic device, as shown in FIG. 11, including:
   a processor 1101, a memory 1102, a transceiver 1103 and a bus interface 1104, where the processor 1101, the memory 1102 and the transceiver 1103 are connected through the bus interface 1104;
   the processor 1101 is configured to read a program from the memory 1102 to execute the following method:
   determining the number of DMRS port groups occupied by downlink transmission data sent to a terminal, where DMRS ports in each of the DMRS port groups have a QCL relationship; and the downlink transmission data is transmitted via at least one transmission point; and
   determining, according to the number of the DMRS port groups occupied by the downlink transmission data, a code word transmission mode corresponding to the downlink transmission data.

In one embodiment, the processor 1101 determines the number of the DMRS port groups occupied by the downlink transmission data according to at least one piece of the following information:
   the number of DMRS port groups recommended by the terminal, a code word transmission mode recommended by the terminal, or the number of transmission layers supported by each transmission point.

In one embodiment, the processor 1101 is further configured to:
   receive, via the transceiver 1103, an uplink signal sent by the terminal via the at least one transmission point; and
   measure the uplink signal and determine the number of transmission layers supported by each transmission point.

In one embodiment, the processor 1101 is further configured to:
   receive, via the transceiver 1103, CSI reported by the terminal, the CSI including the number of transmission layers supported by each transmission point, where the number of transmission layers supported by each transmission point is obtained by the terminal through measuring a downlink signal sent by the network side device via the at least one transmission point.

In one embodiment, the processor 1101 is further configured to:
   receive, via the transceiver 1103, a recommendation message reported by the terminal, the recommendation message including the recommended number of DMRS port groups and/or the recommended code word transmission mode, where the recommended number of DMRS port groups and/or the recommended code word transmission mode is determined by the terminal through measuring measurement according to a downlink signal sent by the network side device via the at least one transmission point.

In one embodiment, the processor 1101 is further configured to:
   determine that the number of the transmission layers of the PDSCH is greater than 1.

In one embodiment, the processor 1101 is configured to:
   determine the number of the DMRS port groups occupied by the downlink transmission data is 2 if the number of transmission layers supported by each transmission point is greater than or equal to 1; and
   determine the number of the DMRS port groups occupied by the downlink transmission data is 1 if the number of transmission layers supported by only one transmission point is greater than or equal to 1.

In one embodiment, the processor 1101 is configured to:
   determine the code word transmission mode corresponding to the downlink transmission data is double code word transmission if the number of the DMRS port groups occupied by the downlink transmission data is determined to be equal to 2.

In one embodiment, the processor 1101 is configured to:
   determine whether the quantities of transmission layers supported by respective transmission points meet a preset rule if the number of the DMRS port groups occupied by the downlink transmission data is determined to be equal to 2, the preset rule being determined by the network side device according to the state of a PDSCH; and
   determine the code word transmission mode corresponding to the downlink transmission data is double code word transmission if the quantities of transmission layers supported by the transmission points are determined to meet the preset rule.

In one embodiment, the preset rule is that the sum of the quantities of transmission layers supported by the transmission points is in a first preset set, where the first preset set is determined by the network side device according to the state of the PDSCH; or
   the preset rule is that the difference between quantities of transmission layers supported by any two of the transmission points is in a second preset set, where the second preset set is determined by the network side device according to the state of the PDSCH.

In one embodiment, the processor 1101 is configured to:
   determine the code word transmission mode corresponding to the downlink transmission data according to the number of the transmission layers of the PDSCH if the number of the DMRS port groups occupied by the downlink transmission data is determined to be equal to 1.

In one embodiment, the processor 1101 is configured to:
   determine the code word transmission mode corresponding to the downlink transmission data is single code word transmission if the number of the transmission layers of the PDSCH is determined to be any one of 2 to 4; and
   determine the code word transmission mode corresponding to the downlink transmission data is double code word transmission if the number of the transmission layers of the PDSCH is determined to be any one of 5 to 8.

In one embodiment, the processor 1101 is further configured to:
   transfer, via the transceiver 1103, the code word transmission mode to the terminal in a signaling or an implicit manner, so that the terminal demodulates the data according to the code word transmission mode.

An embodiment of the present application provides a computer program product including a computer program stored in a non-transitory computer readable storage medium, and the computer program includes program instructions that cause the computer to execute any abovementioned transmission method when the program instructions are executed by the computer.

Figure 12:
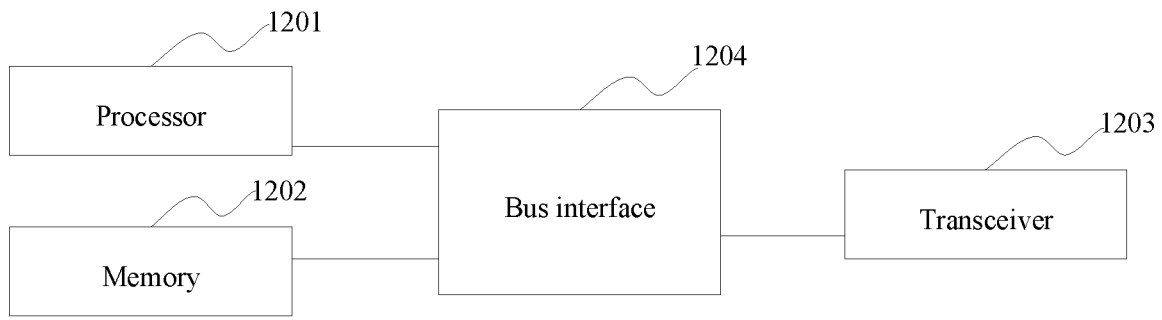
FIG. 12 is a structural diagram of an electronic device provided by an embodiment of the present application.

Based on the same principle, the present application further provides an electronic device, as shown in FIG. 12, including:

a processor 1201, a memory 1202, a transceiver 1203 and a bus interface 1204, where the processor 1201, the memory 1202 and the transceiver 1203 are connected through the bus interface 1204;

the processor 1201 is configured to read a program from the memory 1202 to execute the following method:

receiving, via the transceiver 1203, a recommendation message reported by the terminal, the recommendation message including the recommended number of DMRS port groups and/or the recommended code word transmission mode, where the recommended number of DMRS port groups and/or the recommended code word transmission mode is determined by the terminal through measuring a downlink signal sent by the network side device via the at least one transmission point; and determining a code word transmission mode of downlink transmission data according to the recommended number of DMRS port groups and/or the recommended code word transmission mode.

In one embodiment, the processor 1201 is configured to:
determine the code word transmission mode of the downlink transmission data according to the recommended number of DMRS port groups, the recommended code word transmission mode, and an implementation configuration parameter, where the implementation configuration parameter is determined according to the implementation of the network side device.

In one embodiment, the processor 1201 is configured to:
determine the code word transmission mode of the downlink transmission data and the number of DMRS port groups occupied by the downlink transmission data according to the recommended number of DMRS port groups, the recommended code word transmission mode, and the implementation configuration parameter.

An embodiment of the present application provides a computer program product including a computer program stored in a non-transitory computer readable storage medium, and the computer program includes program instructions that cause the computer to execute any abovementioned transmission method when the program instructions are executed by the computer.

Figure 13:
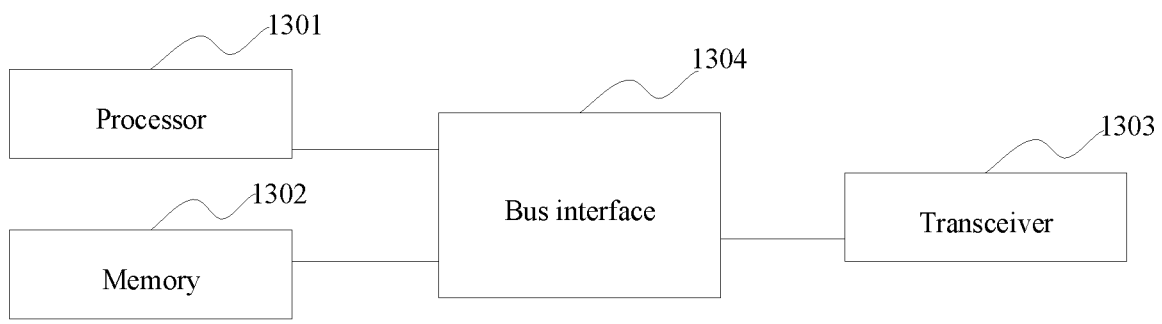
FIG. 13 is a structural diagram of an electronic device provided by an embodiment of the present application.

Based on the same principle, the present application further provides an electronic device, as shown in FIG. 13, including:

a processor 1301, a memory 1302, a transceiver 1303 and a bus interface 1304, where the processor 1301, the memory 1302 and the transceiver 1303 are connected through the bus interface 1304;

the processor 1301 is configured to read a program from the memory 1302 to execute the following method:

receiving, through a transceiver 1303, a downlink signal sent by a network side device via at least one transmission point;

determining measurement data according to the downlink signal; and reporting the measurement data to the network side device, so that the network side device determines a code word transmission mode corresponding to downlink transmission data according to the measurement data.

In one embodiment, the measurement data includes at least one piece of the following information:

the number of DMRS port groups recommended by the terminal, a code word transmission mode recommended by the terminal, or the number of transmission layers supported by each transmission point.

In one embodiment, the measurement data is the number of transmission layers supported by each transmission point, and the processor 1301 is configured to:

add the number of transmission layers supported by each transmission point to CSI, and report the CSI to the network side device.

In one embodiment, the processor 1301 is further configured to:

determine that the number of the transmission layers of the PDSCH is greater than 1.

An embodiment of the present application provides a computer program product including a computer program stored in a non-transitory computer readable storage medium, and the computer program includes program instructions that cause the computer to execute any abovementioned transmission method when the program instructions are executed by the computer.

The present application is described with reference to the flow diagrams and/or block diagrams of the method, device (system) and computer program product according to embodiments of the present application. It should be understood that each process and/or block in the flow diagrams and/or block diagrams, as well as combinations of processes and/or blocks in the flow diagrams and/or block diagrams may be implemented by computer program instructions. The computer program instructions may be provided for a processor of a general purpose computer, a special purpose computer, an embedded processor or other programmable data processing device to produce a machine, so that the instructions processed by the processor of the computer or other programmable data processing device generates an apparatus for achieving functions specified in one or more processes of the flow diagrams and/or one or more blocks of the block diagrams.

The computer program instructions may also be stored in a computer readable memory that can instruct a computer or other programmable data processing device to operate in a specified manner, so that the instructions stored in the computer readable memory generates a manufacture containing an instruction device, where the instruction device achieves the functions specified in one or more processes of the flow diagrams and/or one or more blocks of the block diagrams.

The computer program instructions may also be loaded to a computer or other programmable data processing device, so that a series of operation steps are executed on the computer or other programmable data processing device to generate computer implemented processing, so that the instructions executed on the computer or other programmable data processing device provide steps for achieving functions specified in one or more processes of the flow diagrams and/or one or more blocks of the block diagrams.

What is claimed is:

1. A transmission method, comprising:
   determining, by a network side device, a quantity N of Demodulation Reference Signal (DMRS) port groups occupied by downlink transmission data sent to a terminal, wherein N is greater than or equal to 1;

determining, by the network side device, a code word transmission mode corresponding to the downlink transmission data according to the quantity of the DMRS port groups occupied by the downlink transmission data; and performing, by the network side device, data processing on the downlink transmission data according to the code word transmission mode, and transmitting, by the network side device, the processed downlink transmission data via transmission points corresponding to the N DMRS port groups.

2. The method according to claim 1, wherein the determining, by the network side device, the quantity of the DMRS port groups occupied by the downlink transmission data sent to the terminal comprises:
   determining, by the network side device, the quantity of the DMRS port groups occupied by the downlink transmission data according to at least one piece of following information:
   a quantity of DMRS port groups recommended by the terminal,
   a code word transmission mode recommended by the terminal, or
   quantities of transmission layers supported by the respective transmission points.

3. The method according to claim 2, wherein before determining, by the network side device, the quantity of the DMRS port groups occupied by the downlink transmission data sent to the terminal, the method further comprises:
   receiving, by the network side device, an uplink signal sent by the terminal to at least one of the transmission points;
   measuring, by the network side device, the uplink signal; and
   determining, by the network side device, the quantities of transmission layers supported by the transmission points.

4. The method according to claim 2, wherein before determining, by the network side device, the quantity of the DMRS port groups occupied by the downlink transmission data sent to the terminal, the method further comprises:
   receiving, by the network side device, Channel State Information (CSI) reported by the terminal,
   wherein the CSI comprises the quantities of transmission layers supported by the transmission points, and the quantities of transmission layers supported by the transmission points are obtained by the terminal through measuring a downlink signal sent by the network side device to at least one of the transmission points.

5. The method according to claim 2, wherein before determining, by the network side device, the quantity of the DMRS port groups occupied by the downlink transmission data sent to the terminal, the method further comprises:
   receiving, by the network side device, a recommendation message reported by the terminal;
   wherein the recommendation message comprises the quantity of DMRS port groups recommended by the terminal, and/or the code word transmission mode recommended by the terminal;
   wherein the quantity of DMRS port groups recommended by the terminal and/or the code word transmission mode recommended by the terminal is determined by the terminal through measuring a downlink signal sent by the network side device via at least one of the transmission points.

6. The method according to claim 2, wherein the determining, by the network side device, the quantity of the DMRS port groups occupied by the downlink transmission data sent to the terminal comprises:
   determining, by the network side device, the quantity of the DMRS port groups occupied by the downlink transmission data is 2, when a quantity of transmission layers supported by each transmission point is greater than or equal to 1; and
   determining, by the network side device, the quantity of the DMRS port groups occupied by the downlink transmission data is 1, when a quantity of transmission layers supported by only one of the transmission points is greater than or equal to 1.

7. The method according to claim 1, wherein the determining, by the network side device, the code word transmission mode corresponding to the downlink transmission data according to the quantity of the DMRS port groups occupied by the downlink transmission data comprises:
   determining, by the network side device, the code word transmission mode corresponding to the downlink transmission data is double code word transmission, when the quantity of the DMRS port groups occupied by the downlink transmission data is determined to be greater than or equal to 2.

8. The method according to claim 1, wherein the determining, by the network side device, the code word transmission mode corresponding to the downlink transmission data according to the quantity of the DMRS port groups occupied by the downlink transmission data comprises:
   determining, by the network side device, whether quantities of transmission layers supported by the respective transmission points meet a preset rule when the quantity of the DMRS port groups occupied by the downlink transmission data is determined to be greater than or equal to 2, wherein the preset rule is determined by the network side device according to a quantity of transmission layers of a Physical Downlink Shared Channel (PDSCH); and
   determining, by the network side device, the code word transmission mode corresponding to the downlink transmission data is double code word transmission when the quantities of transmission layers supported by the respective transmission points are determined to meet the preset rule.

9. The method according to claim 8, wherein the preset rule is that a sum of the quantities of transmission layers supported by the respective transmission points is in a first preset set, wherein elements in the first preset set are in a value range of $[1, \ldots, RI\_MAX]$, and RI_MAX is a maximum quantity of transmission layers of the PDSCH; or
   the preset rule is that a difference between quantities of transmission layers supported by any two of the transmission points is in a second preset set, wherein elements in the second preset set are in a value range of $[0, \ldots, RI\_MAX]$.

10. The method according to claim 1, wherein the determining, by the network side device, the code word transmission mode corresponding to the downlink transmission data according to the quantity of the DMRS port groups occupied by the downlink transmission data comprises:
    determining, by the network side device, the code word transmission mode corresponding to the downlink transmission data according to a quantity of transmission layers of a PDSCH when the quantity of the DMRS port groups occupied by the downlink transmission data is determined to be equal to 1.

11. The method according to claim 10, wherein the determining, by the network side device, the code word transmission mode corresponding to the downlink transmission data according to the quantity of transmission layers of the PDSCH comprises:
- determining, by the network side device, the code word transmission mode corresponding to the downlink transmission data is single code word transmission when the quantity of the transmission layers of the PDSCH is determined to be any one of 2 to 4; and
- determining, by the network side device, the code word transmission mode corresponding to the downlink transmission data is double code word transmission when the quantity of the transmission layers of the PDSCH is determined to be any one of 5 to 8;
- wherein after determining, by the network side device, the code word transmission mode corresponding to the downlink transmission data according to the quantity of the DMRS port groups occupied by the downlink transmission data, the method further comprises:
- transferring, by the network side device, the code word transmission mode to the terminal in a signaling or an implicit manner, for instructing the terminal to demodulate data according to the code word transmission mode;
- wherein before determining, by the network side device, the quantity of the DMRS port groups occupied by the downlink transmission data sent to the terminal, the method further comprises:
- determining, by the network side device, that the quantity of the transmission layers of the PDSCH is greater than 1;
- wherein DMRS ports in each of the DMRS port groups have a Quasi Co-Location (QCL) relationship.

12. A transmission method, comprising:
- receiving, by a network side device, a recommendation message reported by a terminal, wherein the recommendation message comprises a recommended quantity of Demodulation Reference Signal (DMRS) port groups and/or a recommended code word transmission mode, wherein the recommended quantity of DMRS port groups and/or the recommended code word transmission mode is determined by the terminal through measuring a downlink signal sent by the network side device via at least one transmission point; and
- determining, by the network side device, a code word transmission mode of downlink transmission data according to the recommended quantity of DMRS port groups and/or the recommended code word transmission mode.

13. The method according to claim 12, wherein the determining, by the network side device, the code word transmission mode of the downlink transmission data according to the recommended quantity of DMRS port groups and/or the recommended code word transmission mode comprises:
- determining, by the network side device, the code word transmission mode of the downlink transmission data according to the recommended quantity of DMRS port groups, the recommended code word transmission mode, and an implementation configuration parameter, wherein the implementation configuration parameter is determined according to an implementation of the network side device;
- wherein the determining, by the network side device, the code word transmission mode of the downlink transmission data according to the recommended quantity of DMRS port groups, the recommended code word transmission mode, and the implementation configuration parameter comprises:
- determining, by the network side device, the code word transmission mode of the downlink transmission data and a quantity of DMRS port groups occupied by the downlink transmission data according to the recommended quantity of DMRS port groups, the recommended code word transmission mode, and the implementation configuration parameter.

14. A transmission method, comprising:
- receiving, by a terminal, a downlink signal sent by a network side device via at least one transmission point;
- determining, by the terminal, measurement data according to the downlink signal; and
- reporting, by the terminal, the measurement data to the network side device for determining a code word transmission mode corresponding to downlink transmission data according to the measurement data;
- wherein the measurement data comprises at least one piece of following information:
- a quantity of DMRS port groups recommended by the terminal, a code word transmission mode recommended by the terminal, or quantities of transmission layers supported by respective transmission points.

15. The method according to claim 14, wherein the measurement data is quantities of transmission layers supported by respective transmission points, and
- the reporting, by the terminal, the measurement data to the network side device comprises:
- adding, by the terminal, the quantities of transmission layers supported by the transmission points to Channel State Information (CSI), and
- reporting, by the terminal, the CSI to the network side device.

16. The method according to claim 14, wherein before receiving, by the terminal, the downlink signal sent by the network side device via the at least one transmission point, the method further comprises:
- determining, by the terminal, that a quantity of transmission layers of a Physical Downlink Shared Channel (PDSCH) is greater than 1.

17. An electronic device, comprising:
at least one processor; and
a memory in communication connection with the at least one processor, wherein
the memory stores instructions executable by the at least one processor, and the instructions are executed by the at least one processor to cause the at least one processor to execute the method of claim 1.

18. An electronic device, comprising:
at least one processor; and
a memory in communication connection with the at least one processor, wherein
the memory stores instructions executable by the at least one processor, and the instructions are executed by the at least one processor to cause the at least one processor to execute the method of claim 15.

19. An electronic device, comprising:
at least one processor; and
a memory in communication connection with the at least one processor, wherein
the memory stores instructions executable by the at least one processor, and the instructions are executed by the at least one processor to cause the at least one processor to execute the method of claim 18.

* * * * *